United States Patent [19]

Morimoto et al.

[11] Patent Number: 4,959,821
[45] Date of Patent: Sep. 25, 1990

[54] OPTICAL PICK-UP FOR SCANNING A MAGNETO-OPTICALLY RECORDED MEDIUM

[75] Inventors: Yasuaki Morimoto; Friedhelm Zucker, both of Villingen-Schwenningen, Fed. Rep. of Germany

[73] Assignee: Deutsche Thomson-Brandt GmbH, VS-Villingen, Fed. Rep. of Germany

[21] Appl. No.: 250,728

[22] Filed: Sep. 28, 1988

[30] Foreign Application Priority Data

Sep. 30, 1987 [DE] Fed. Rep. of Germany ....... 3732944

[51] Int. Cl.$^5$ .............................................. G11B 11/10
[52] U.S. Cl. .................................... 369/13; 360/114; 369/107
[58] Field of Search .............................. 369/32, 43–47, 369/107, 13; 360/114; 365/122; 358/342

[56] References Cited

U.S. PATENT DOCUMENTS 4,569,035  2/1986  Tomita ................................ 365/122
4,691,308  9/1987  Takagi et al. ...................... 369/47 X Primary Examiner—Robert L. Richardson
Attorney, Agent, or Firm—Max Fogiel

[57] ABSTRACT

An optical pick-up for scanning a magneto-optically recorded disk in which the disk reflects a first principal beam onto a first photodetector. This first principal beam has a plane of polarization which is rotated in one direction. The recorded disk reflects a second principal beam onto a second photodetector. This second principal beam has a plane of polarization that is rotated in another direction. A data signal is generated from the difference between output photovoltages of the first and second photodetectors. A diffraction grating splits the main beam from a light emitting source, into the principal beams and into subsidiary beams. The main beam from the light emitting source is focused on the recorded disk through the diffraction grating. Auxiliary photovoltages are generated from the auxiliary beams, and these are subtracted for generating the data signal. The output voltage of the second photodetector has noise components that are in phase and which are generated by the main beam. This output voltage of the second photodetector contains also noise components of opposite phase that are generated by the subsidiary beams. The output signal of the first photodetector, on the other hand, has only noise components generated by the main beam.

6 Claims, 2 Drawing Sheets

OPTICAL PICK-UP FOR SCANNING A MAGNETO-OPTICALLY RECORDED MEDIUM

BACKGROUND OF THE INVENTION

The invention concerns an optical pick-up for scanning an magneto-optically recorded medium on the three-beam principle, with a diffraction element, whereby the principal beam that has a plane of polarization rotated in one direction is reflected by the magneto-optically recorded medium onto a photodetector and the principal beam that has a plane of polarization rotated in the other direction is reflected by the magneto-optically recorded medium onto another photodetector and whereby the data signal is constructed out of the difference between the photovoltages of the first and the second photodetectors.

The design and function of an optical pick-up for a compact-disk player are described in Electronic Components and Applications 6 (1984), 4, 209-15.

How the Kerr effect is employed to enter information in and read it from an magneto-optic disk is described in "Magnetooptische Versuche dauern an" ["magneto-optic tests continue"], Funkschau 13, 6/20/1986, 37–41.

DETAILED DESCRIPTION OF THE DRAWINGS

Figure 1:
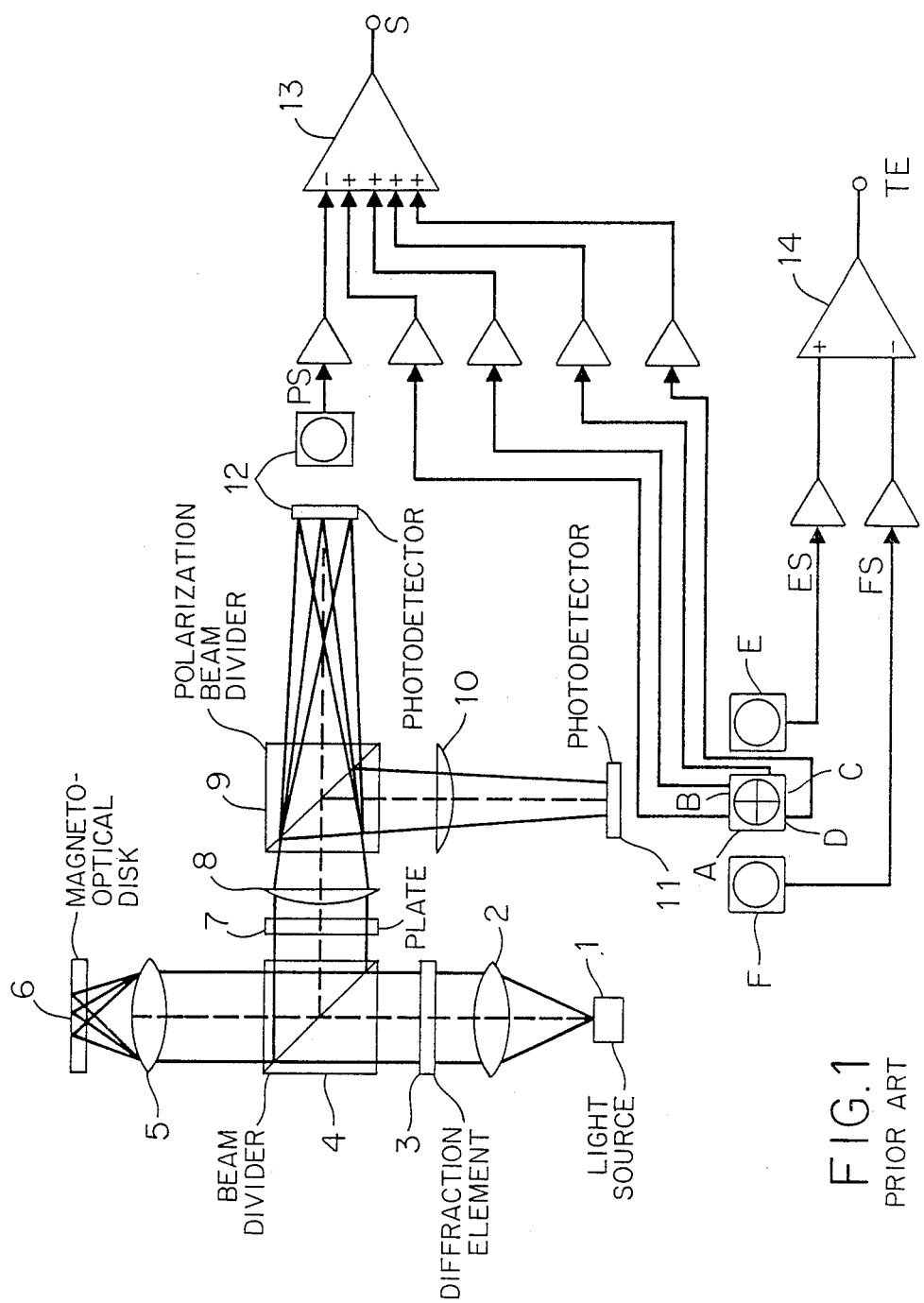
FIG. 1 depicts an optical pick-up arrangement for reading magneto-optic media, utilizing three beams.

FIG. 1 illustrates an optical pick-up that reads a magneto-optic disk 6 on the three-beam principle. A beam emitted by a source 1 of light, usually a laser, is focussed on magneto-optic disk 6 through a lens 2, a diffraction grating 3, a prismatic beam divider 4, and another lens 5. Diffraction grating 3 splits the beam into a principal beam and into subsidiary beams of the orders +1, −1, +2, −2, etc. The principal beam is employed to read out the information, and the beams of the +1st and −1st order to generate a tracking-error signal TE=ES−FS. The beams reflected by magneto-optic disk 6—the principal beam and the beams of the +1st and −1st order—which have their planes of polarization rotated either to the right or to the left depending on the magnetic orientation of magneto-optic disk 6 in focus, travel back through second lens 5 to beam-divider prism 4, which deflects them at a right angle to a polarization-beam divider 9 by way of a lambda/2 plate 7 and a lens 8. The principal beam that is rotated in one direction, to the right for example, arrives through a lens 10 at a photodetector 11 that consists of four quadrants A, B, C, and D. The principal beam that is rotated to the left is deflected to a photodetector 12. The beam of the +1st order that has a plane of polarization that is rotated to the right is deflected through a lens 11 to a photodetector F. The beam of the −1st order that has a plane of polarization that is also rotated to the right arrives at a photodetector E though lens 11. The principal beam that is rotated in the other direction, to the left in the present example, arrives along with the beams of the +1st and −1st order, which are also rotated to the left, at photodetector 12. The photovoltage GS of photodetector 12 is supplied to the subtracting input terminal of a differential amplifier 13. The output voltages AS, BS, CS, and DS of quadrants A, B, C, and D are supplied to the adding input terminals of differential amplifier 13. A data signal S=AS+CS+DS−PS is obtained from the output terminal of differential amplifier 13. The photovoltage ES of photodetector E is supplied to the adding input terminal of a differential amplifier 14. The photovoltage of photodetector F is supplied to the subtracting input terminal of differential amplifier 14. Tracking-error signal TE=ES−FS can accordingly be obtained from the output terminal of differential amplifier 14.

Because only the principal beam strikes the photodetector 11 with the four quadrants A, B, C, and D and because the principal beam strikes photodetector 12 in conjunction with the beams with orders higher or lower than order 0, there will be more noise in data signal S. To eliminate this undesired noise, which is generated by diffraction products—the beams of higher and lower orders—photodetector 12 must be precisely adjusted to ensure that only principal beam strikes it. An adjustment of such precision, in the vicinity of some 100 $\mu$m, however, not only demands very sensitive fingers but takes a lot of time.

SUMMARY OF THE INVENTION

The object of the invention is accordingly to provide an optical pick-up of the type whereby there will be no more noise in the data signal as the result of diffraction products of orders higher or lower than 0 and whereby the second photodetector will not need to be adjusted.

This object is attained in accordance with the invention in that the beams of orders higher than the +1st and lower than the −1st are also reflected onto the second photodetector by the magneto-optically recorded medium and in that at least the photovoltages generated by the beams of the +1st and −1st orders are subtracted to generate the data signal of photovoltage PS.

Figure 2:
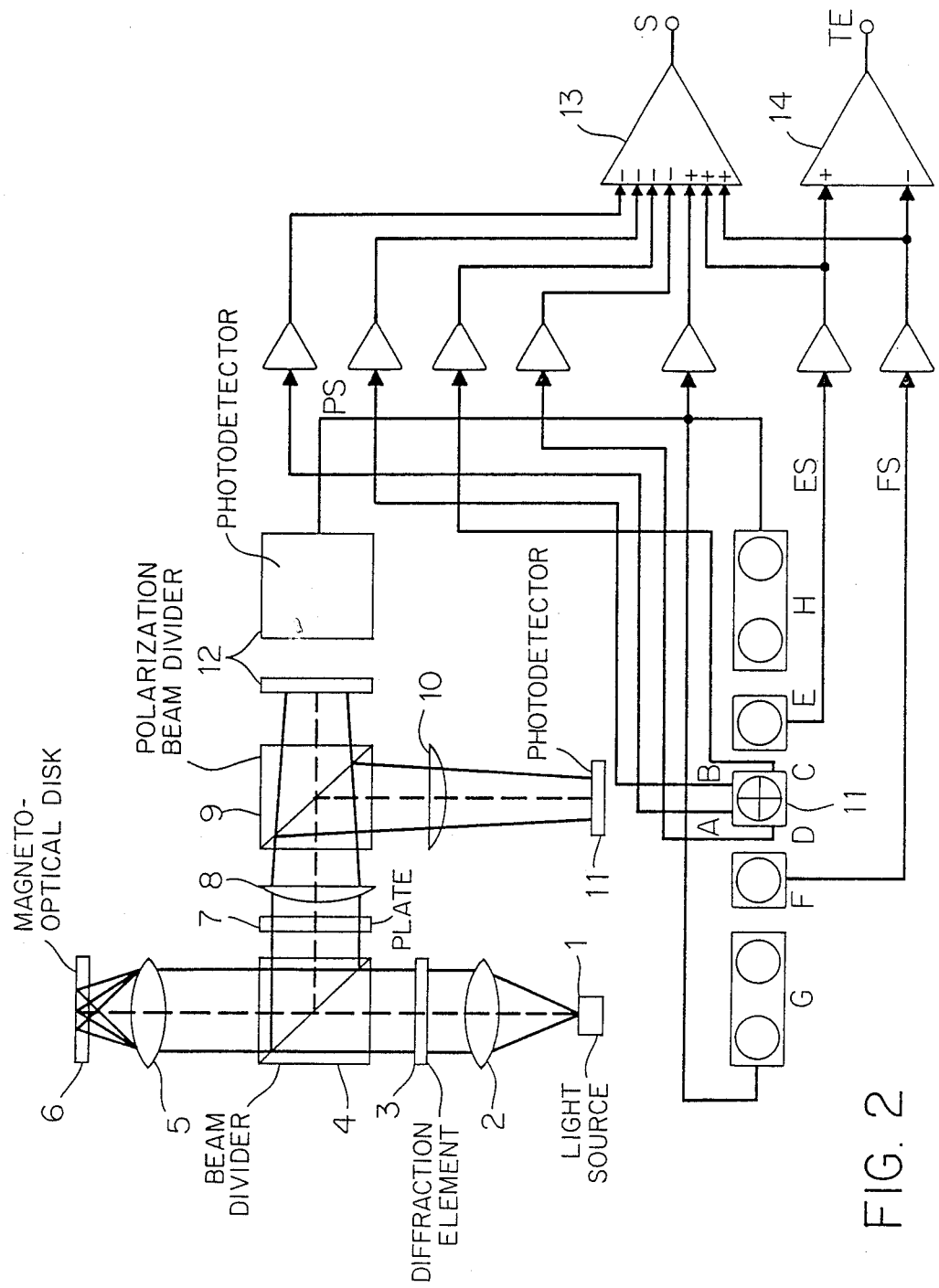
FIG. 2 depicts an embodiment of the invention in which magneto-optic media is read and in which noise is reduced by reflecting beams of orders higher than the +1st and lower than the −1st onto a photodetector.

The invention will now be specified qith reference to the embodiment illustrated in FIG. 2.

The beam of light is again focused as illustrated in FIG. 1 on magneto-optic disk 6 through a lens 2, a diffraction grating 3, a prismatic beam divider 4, and another lens 5. Diffraction grating 3 splits the beam into a principal beam and into subsidiary beams of the orders +1, −1, +2, −2, etc. The principal beam is employed to read out the information, and the beams of the +1st and −1st order to generate a tracking-error signal TE=ES−FS. The beams reflected by magneto-optic disk 6—the principal beam and the beams of the +1st and −1st order—which have their planes of polarization rotated either to the right or to the left depending on the magnetic orientation of magneto-optic disk 6 at the point of focus, travel back through second lens 5 to prismatic beam divider 4, which deflects them at a right angle to a polarization-beam divider 9 by way of a lambda/2 plate 7 and a lens 8. The principal beam that is rotated in the one direction, to the right for example, arrives through a lens 10 at a photodetector 11 that consists of four quadrants A, B, C, and D. The principal beam that is rotated to the left is deflected to a photodetector 12. The beam of the +1st order, that has a plane of polarization that is rotated to the right is deflected through a lens 11 to a photodetector F. The beam of the −1st order that has a plane of polarization that is also rotated to the right arrives at a photodetector E though lens 11. The principal beam that is rotated in the other direction, to the left in the present example, arrives along with the beams of the +1st and −1st order, which are also rotated to the left, at photodetector 12. The photovoltage ES of photodetector E is supplied to the first adding input terminal of a differential amplifier 13, from the output terminal of which data signal S can be obtained, and to the adding input terminal of differential amplifier 14. The photovoltage FS of photodetector F is supplied to the second adding input terminal of differential amplifier 13 and to the subtracting input terminal of differential amplifier 14. Tracking-error signal TE=ES−FS can be obtained from the output terminal of differential amplifier 14. The photovoltages AS, BS, CS, and DS of the individual quadrants A, B, C, and D of lens 11 are each applied to a subtracting input terminal of differential amplifier 13. In addition to the photodetector E, there is a photodetector H, positioned such that the beams with an order lower than −1 strike it. The photovoltages GS, HS, and PS of photodetectors G, H and 12 are individually supplied to one adding input terminal of differential amplifier 13. A data signal S=ES+FS+GS+HS+PS−(AS+BS+CS+DS) is accordingly constructed in differential amplifier 13. Data signal S now represents only the difference between the two beams of order 0—the left-rotated principal beam and the right-rotate principal beam—because the photovoltages ES, FS, GS, and HS generated by the diffraction products of orders higher or lower than 0 have been subtracted from photovoltage PS, the sum of all the photovoltages. Because photovoltages ES, FS, GS, and HS are phase-shifted 180° in relation to the photovoltages generated in photodetector 12 by the diffraction products of orders high or lower than 0, they are connected together additively.

Because the photovoltages generated by the diffraction products are subtracted in differential amplifier 13 from photovoltage PS, which is the sum of the photovoltages generated from the principal beam and by the diffraction products with planes of polarization rotated in the same direction, photodetector 12 can be relatively large and does not have to adjusted as precisely as previously mentioned herein, but only coarsely.

The embodiment illustrated in FIG. 2 can be simplified by eliminating photodetectors G and H. Although in that case only the photovoltages generated from the diffraction products of the +1st and −1st will be subtracted from the photovoltage GS of photodetector 12, there will still be a considerable decrease in the noise in data signal S.

What is claimed is:

1. An optical pick-up for scanning a magneto-optically recorded medium comprising: a first photodetector, said recorded medium reflecting a first principal beam having a plane of polarization rotated in one direction onto said first photodetector; a second photodetector, said recorded medium reflecting a second principal beam having a plane of polarization rotated in another direction onto said second photodetector, said first and second photodetectors having output photovoltages; means for generating a data signal from the difference between said output photovoltages of said first and second photodetectors; a beam emitting source; diffraction means, a main beam from said emitting source being focused on said magneto-optically recorded medium through said diffraction means, said diffraction means splitting said mean beam into said principal beams and into subsidiary beams of at least orders +1 and −1; beams of orders higher than +1 and lower than −1 being also reflected onto said second photodetector by said recorded medium; means for generating auxiliary photovoltages from said beams of +1 and −1 orders; and means for subtracting at least said auxiliary photovoltages for generating said data signal, the output voltage of said second photodetector having noise components that are in phase and that are generated from said main beam, the output voltage of said second photodetector having also noise components of opposite phase that are generated from said subsidiary beams, the output signal of said first photodetector having only noise components generated by said main beam.

2. An optical pick-up as defined in claim 1, including a third photodetector, said magneto-optically recorded medium reflecting the beam of +1 order onto said third photodetector; a fourth photodetector, said magneto-optically recorded medium reflecting the beam of −1 order onto said fourth photodetector; said third photodetector and said fourth photodetector having each output photovoltages; means for generating the difference between said output photovoltages from said third and fourth photodetectors; means for generating a tracking-error signal from said difference of output photovoltages of said third and fourth photodetectors; and means for subtracting the output photovoltages of said third and fourth photodetectors from the output photovoltage of said second photodetector.

3. An optical pick-up as defined in claim 2, including a fifth photodetector, said magneto-optically recorded medium reflecting beams of an order higher than +1 order onto said fifth photodetector; a sixth photodetector, said magneto-optically recorded medium reflecting beams of an order lower than −1 order onto said sixth photodetector; said fifth and sixth photodetectors having each output photovoltages; and means for subtracting said output photovoltages of said fifth and sixth photodetectors from the output photovoltage of said second photodetector.

4. A method for scanning a magneto-optically recorded medium, comprising the steps: focusing a main beam from a beam emitting source on said magneto-optically recorded medium through diffraction means; splitting said main beam by said diffraction means into principal beams and into subsidiary beams of at least orders +1 and −1; reflecting a first principal beam onto a first photodetector by said recorded medium, said first principal beam having a plane of polarization rotated in one direction; reflecting a second principal beam by said recorded medium onto a second photodetector, said second principal beam having a plane of polarization rotated in another direction; generating a data signal from the difference between output photovoltages of said first and second photodetectors; reflecting subsidiary beams of orders higher than +1 and lower than −1 onto said second photodetector by said recorded medium; generating auxiliary photovoltages from said beams of +1 and −1 orders; subtracting at least said auxiliary photovoltages for generating said data signal, the output voltage of said second photodetector having noise components that are in phase and that are generated from said mean beam, the output voltage of said second photodetector having also noise components of opposite phase that are generated from said subsidiary beams, the output signal of said first photodetector having only noise components generated by said main beam.

5. A method as defined in claim 4, including the step of: reflecting the beam of +1 order by said magneto-optically recorded medium onto a third photodetector; reflecting the beam of −1 order by said recorded medium onto a fourth photodetector; generating a tracking-error signal from the difference between output photovoltages of said third and fourth photodetectors; and subtracting the output photovoltages of said third and fourth photodetectors from the output photovoltage of said second photodetector.

6. A method as defined in claim 5, including the step: reflecting beams of an order higher than +1 order onto a fifth photodetector by said recorded medium; reflecting beams of order lower than −1 order onto a sixth photodetector by said recorded medium; and subtracting output photovoltages of said fifth and sixth photodetectors from the output photovoltage of said second photodetector.

* * * * *